(12) United States Patent
Zhang et al.

(10) Patent No.: US 11,829,715 B2
(45) Date of Patent: Nov. 28, 2023

(54) TEXT-BASED NEWS SIGNIFICANCE EVALUATION METHOD, APPARATUS, AND ELECTRONIC DEVICE

(71) Applicant: Business Management Advisory LLC, Palatine, IL (US)

(72) Inventors: Qingquan Zhang, Palatine, IL (US); Wenxi Lu, Palatine, IL (US); He Chen, Palatine, IL (US); Ying Wu, Palatine, IL (US)

(73) Assignee: Business Management Advisory LLC, Palatine, IL (US)

( * ) Notice: Subject to any disclaimer, the term of this patent is extended or adjusted under 35 U.S.C. 154(b) by 0 days.

(21) Appl. No.: 17/145,381

(22) Filed: Jan. 10, 2021

(65) Prior Publication Data
US 2022/0075938 A1 Mar. 10, 2022

(30) Foreign Application Priority Data
Sep. 4, 2020 (CN) .......................... 202010918807.9

(51) Int. Cl.
*G06F 40/216* (2020.01)
*G06F 40/242* (2020.01)
(Continued)

(52) U.S. Cl.
CPC .......... *G06F 40/216* (2020.01); *G06F 40/242* (2020.01); *G06F 40/295* (2020.01); *G06N 7/01* (2023.01)

(58) Field of Classification Search
CPC .... G06F 40/216; G06F 40/242; G06F 40/295; G06F 40/284; G06F 40/205; G06N 7/005; G06N 3/08; G06N 7/01
See application file for complete search history.

(56) References Cited

U.S. PATENT DOCUMENTS 9,727,553 B2 * 8/2017 Yakovlev .............. G06F 40/242
10,915,756 B2 * 2/2021 Lu ........................ G06V 30/413
(Continued)

FOREIGN PATENT DOCUMENTS

CN           112016294 A  * 12/2020      ........... G06F 40/205

OTHER PUBLICATIONS

Mittermayer, Marc-Andre'. Forecasting Intraday Stock Price Trends with Text Mining Techniques. Proceedings of the 37th Hawaii International Conference on System Sciences—2004. 0-7695-2056-1/04 © 2004 IEEE. 10 pages. (Year: 2004).*

(Continued)

*Primary Examiner* — Tadesse Hailu
(74) *Attorney, Agent, or Firm* — Weisun Rao; Jun Chen; Venture Partner, LLC

(57) ABSTRACT

The present invention provides text-based news significance evaluation methods, apparatuses, and electronic devices for improving efficiency and accuracy of news significance evaluation, and implementing real-time dynamic evaluation on text news. The method comprises: reading text news; preprocessing the text news to obtain original data; extracting feature values from the original data, which comprises metadata, a keyword, and a probability model feature value; and obtaining a score of each feature value according to a weight ratio corresponding to each feature value. The apparatus comprises: a text news reading module, a text news preprocessing module, a feature value extraction module, a feature value weight determining module, and a text news significance evaluation module. The electronic device comprises a memory and a processor. The memory stores a computer program that can run on the processor. When executing the computer program, the processor implements the text-based news significance evaluation method.

12 Claims, 2 Drawing Sheets

(51) Int. Cl.
    *G06F 40/295*    (2020.01)
    *G06N 7/01*     (2023.01)

(56) References Cited

U.S. PATENT DOCUMENTS

| | | | | |
|---|---|---|---|---|
| 10,929,609 | B1* | 2/2021 | Mitchell | G06N 3/105 |
| 11,334,949 | B2* | 5/2022 | Kim | G06K 9/6271 |
| 11,461,847 | B2* | 10/2022 | Xiu | G06F 40/284 |
| 2010/0145678 | A1* | 6/2010 | Csomai | G06F 40/169 |
| | | | | 704/10 |
| 2013/0138577 | A1* | 5/2013 | Sisk | G06Q 40/04 |
| | | | | 705/36 R |
| 2013/0290232 | A1* | 10/2013 | Tsytsarau | G06N 5/027 |
| | | | | 706/46 |
| 2015/0303941 | A1* | 10/2015 | Hayes | G06F 40/10 |
| | | | | 704/201 |
| 2018/0336282 | A1* | 11/2018 | Pandey | G06F 16/9535 |
| 2019/0163828 | A1* | 5/2019 | Yan | G06F 16/353 |
| 2019/0213407 | A1* | 7/2019 | Toivanen | G06N 20/00 |
| 2021/0103626 | A1* | 4/2021 | Jolly | G06F 16/345 |

OTHER PUBLICATIONS

Shynkevich et al. Stock Price Prediction based on Stock-Specific and Sub-Industry-Specific News Articles. 978-1-4799-1959-8/15 © 2015 IEEE. 8 pages (Year: 2015).*

Griffiths et al. Finding scientific topics. Published Apr. 6, 2004 in PNAS, vol. 101, suppl. 1, www.pnas.org/cgi/doi/10.1073/pnas. 0307752101. pp. 5228-5235. (Year: 2004).*

* cited by examiner

TEXT-BASED NEWS SIGNIFICANCE EVALUATION METHOD, APPARATUS, AND ELECTRONIC DEVICE

FIELD OF THE INVENTION

The present invention relates to the technical field of news value evaluation, and in particular, to methods, apparatuses, and electronic devices for text-based news significance evaluation.

BACKGROUND OF THE INVENTION

With the development of network technology and the wide application of new media, the amount of various news generated and released is increasing significantly. It is important to select news of higher value from the massive amount of data.

Existing news value evaluation technology focuses more on news in extensive fields, and calculates influence of different news value feature items on prediction of news value according to change in user attention, so as to complete estimation of news significance feature items. Traditional news value evaluation methods primarily reflect universally applicable significance evaluation, and perform indiscriminate evaluation on users in news sources and social media, and therefore, not only cannot be directly used to predict and evaluate significance of news texts in a single field, but also severely restrict effective dissemination of industrial data and policy information.

Therefore, how to evaluate significance of news texts in a single field more accurately and efficiently has become an important issue urgently to be solved in the technical field of news value evaluation.

SUMMARY OF THE INVENTION

To overcome the foregoing technical drawbacks, the present invention provides a text-based news significance evaluation method, apparatus, and electronic device to greatly improve efficiency and precision of predicting and evaluating significance of news texts in a single field.

To achieve the foregoing objective, the technical solution of the present invention is as follows.

One aspect of the present invention provides a text-based news significance evaluation method. The method includes:
  reading text news;
  preprocessing the text news to obtain original data;
  extracting feature value(s) from the original data, wherein the feature value(s) comprise metadata, a keyword, and a probability model feature value;
  obtaining a score of each feature value according to a weight ratio corresponding to each feature value; and evaluating significance of the text news according to the score of each feature value.

In some embodiments, the text news includes a news text in a txt or pdf format.

In some embodiments, the preprocessing includes, but is not limited to: converting a character sequence to a lower-case character, selecting a word within a specific length range, deleting an invalid character, deleting a numeral, deleting a stop word, and extracting a stem and/or restoring a part of speech.

In some embodiments, different preprocessing methods are selected depending on the type of the feature value, as follows:

when the type of the feature value is metadata, preprocessing the text news by selecting the method(s) of deleting an invalid character and/or deleting a stop word;

when the type of the feature value is a keyword, preprocessing the text news by selecting the method(s) of deleting an invalid character, deleting a stop word, and/or deleting a numeral; and when the type of the feature value is a probability model feature value, preprocessing the text news by selecting the method(s) of deleting an invalid character, deleting a stop word, deleting a numeral, and/or extracting a stem and restoring a part of speech.

In some embodiments, the extracting the keyword comprises the following steps:

S1. constructing a multivariate dictionary, which further comprises:
  selecting financial sector keywords to form a static dictionary;
  dynamically obtaining training set keywords through natural language processing and neural network training to form a dynamic dictionary, wherein the training set keywords do not overlap with the financial sector keywords; and
  combining the static dictionary and the dynamic dictionary to form a multivariate dictionary, S2. recognizing a named entity, which further comprises:
  obtaining a named entity for evaluation through natural language processing and neural network training; and recognizing the named entity as a keyword by using a neural network model, and S3. sorting keywords, which further comprises:
  extracting, through popularity search, a popularity value from the keyword in the multivariate dictionary described in step S1 and the keyword obtained by recognizing the named entity in step S2, and sorting the keywords according to the popularity value.

In some embodiments, the extracting a probability model includes the following steps:

(a) obtaining a model and training set keywords for significance evaluation by training the probability model, wherein the probability model is a latent Dirichlet allocation model; and in the latent Dirichlet allocation model, a document is generated by the following method:
  taking a sample from a Dirichlet allocation $\alpha$ to generate a topic distribution $\theta_i$ of a document i;
  taking a sample from the topic distribution $\theta_i$ to generate a topic $z_{i,j}$ of a $j^{th}$ word of the document i;
  taking a sample from a Dirichlet allocation $\beta$ to generate a word distribution $\phi_{z_{i,j}}$ corresponding to the topic $z_{i,j}$; and
  taking a sample from the word distribution $\phi_{z_{i,j}}$ to finally generate a word $w_{i,j}$;
  wherein a joint distribution of all visible variables and hidden variables in the probability model is:

$$p(w_i, z_i, \theta_i, \Phi \mid \alpha, \beta) = \prod_{j=1}^{N} p(\theta_i \mid \alpha) p(z_{i,j} \mid \theta_i) p(\Phi \mid \beta) p(w_{i,j} \mid \phi_{z_{i,j}});$$

a maximum likelihood estimation of a word distribution of the document is obtainable by integrating $\theta_i$ and $\phi_{z_{i,j}}$ in the foregoing formula and summing $z_{i,j}$:

$$p(w_i \mid \alpha, \beta) = \int_{\theta_i} \int_{\Phi} \sum_{z_i} p(w_i, z_i, \theta_i, \Phi \mid \alpha, \beta); \text{ and}$$

and (b) using Gibbs sampling to estimate an unknown parameter of the latent Dirichlet allocation model:

$$p(z_i = k \mid \vec{z}_{\neg i}, \vec{w}) \propto \frac{n_{m,\neg i}^{(k)} + \alpha_k}{\sum_{k=1}^{K}\left(n_{m,\neg i}^{(k)} + \alpha_k\right)} \cdot \frac{n_{k,\neg i}^{(t)} + \beta_t}{\sum_{t=1}^{V}\left(n_{k,\neg i}^{(t)} + \beta_t\right)}$$

where $n_{m,\neg i}^{(k)}$ is a quantity of occurrences of a topic k in m documents, and $n_{k,\neg i}^{(t)}$ is a quantity of occurrences of a word t in a $k^{th}$ topic.

In some embodiments, the obtaining of the training set keywords is dynamic, a target word that has not appeared in a training set is added as a keyword in the training set by training, and the training set keywords are sorted in real time through popularity search and then used for evaluation.

In some embodiments, the method is implemented by a processor in a computing device.

In another aspect, the present invention provides a text-based news significance evaluation apparatus, comprising:

a text news reading module, configured to read text news, wherein the text news includes a news text in a txt or pdf format;

a text news preprocessing module, configured to preprocess the text news read by the text news reading module to obtain original data, wherein the preprocessing includes, but is not limited to: converting a character sequence to a lowercase character, selecting a word within a specific length range, deleting an invalid character, deleting a numeral, deleting a stop word, and/or extracting a stem and restoring a part of speech;

a feature value extraction module, configured to extract, from the original data, feature values including metadata, a keyword, and a probability model feature value;

a feature value weight determining module, configured to calculate a weight ratio corresponding to each feature value, and determine a score of each feature value; and a text news significance evaluation module, configured to evaluate significance of the text news according to the score of each feature value.

In some embodiments, the feature value extraction module further includes:

a metadata module, configured to calculate a quantity of numerals included in the original data;

a keyword module, configured to dynamically obtain keywords and sort the keywords according to a popularity value; and a probability model feature value module, configured to perform dynamic distribution training on a probability model, and obtain a model and training set keywords for significance evaluation.

In a further aspect, the present invention provides a text-based news significance evaluation electronic device comprising a memory and a processor. The memory may store a computer program that runs on the processor. When executing the computer program, the processor may implement any of the above-discussed text-based news significance evaluation methods or a method described in any possible implementation thereof. In some embodiments, the electronic device further includes a bus and a communication interface, wherein the memory, the processor, and the communication interface are connected through the bus.

The beneficial effects achieved by the present invention include the following: While traditional news significance evaluation methods are not applicable to news evaluation in a single field, the present invention discloses text-based news significance evaluation method, apparatus, and electronic device, to construct a mechanism of dynamically obtaining keywords in the financial news field and a mechanism of weighted scoring. The present invention uses methods such as natural language processing and neural network training to dynamically extract feature items for value evaluation of significant news. Based on a keyword popularity search mechanism, the present invention assigns different weights to the feature items, and marks significance of financial news, thereby greatly improving efficiency and accuracy of news significance evaluation and implementing real-time dynamic evaluation.

Other features and advantages of the present invention will be further described in the subsequent specification, and partially become apparent from the specification, or be understood by implementing the present invention. An objective and other advantages of the present invention are achieved and obtained in structures that are specially pointed out in the specification and the accompanying drawings.

To make the foregoing objectives, features, and advantages of the present invention easier to understand, a detailed description is made below by using listed exemplary embodiments with reference to the accompanying drawings.

BRIEF DESCRIPTION OF THE FIGURES

To more clearly describe the technical solutions in the embodiments of the present invention or in the prior art, the following will briefly introduce the drawings required for describing the embodiments or the prior art. It is apparent that the drawings in the following description are only some embodiments described in the present invention, and a person of ordinary skill in the art may obtain other drawings on the basis of these drawings without any creative effort.

DETAILED DESCRIPTION OF THE INVENTION

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

As used herein, certain procedures described in the specification, the claims, and/or the accompanying drawings of the present invention include a plurality of operations described in a particular order. However, it should be clearly understood that these operations may be performed sequentially in an order different from the order described herein or may be performed concurrently or in parallel. Sequence numbers, such as S1 and S2, of the operations are merely used to distinguish different operations, and the sequence numbers do not represent any execution order. In addition, these procedures may include more or fewer operations, and these operations may be performed sequentially or in parallel.

Research on how to evaluate news significance is crucial to editing work of journalists, online commercial advertising, and online public opinion detection. Conventional evaluation methods typically analyze news significance in extensive fields, and are of low accuracy and inapplicable to evaluating significance of news in a single field. As such, the present invention provides text-based news significance evaluation method, apparatus, and electronic device, capable of improving accuracy of news significance evaluation.

To further illustrate objectives, technical solutions, and advantages of the present invention, the text-based news significance evaluation method, apparatus, and electronic device according to the present invention will be further described in detail below in conjunction with specific embodiments.

Figure 1:
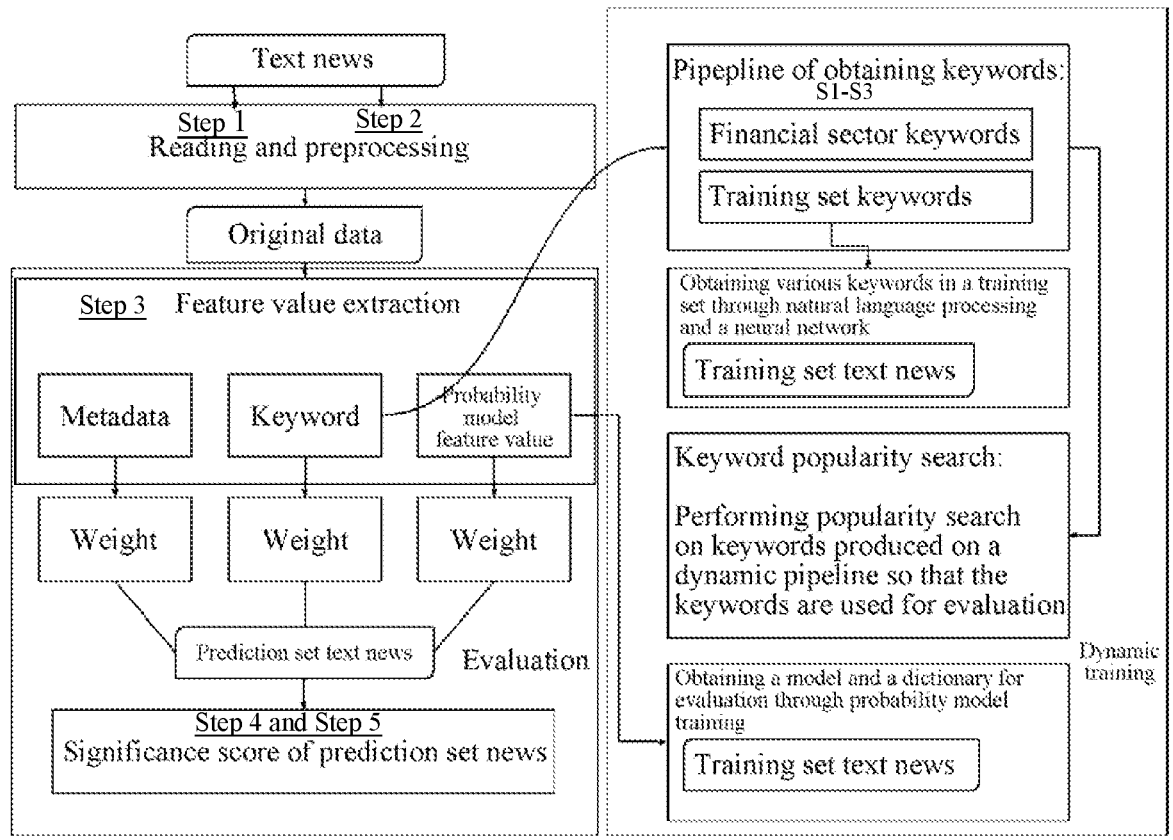
FIG. 1 is a schematic flowchart of a text-based news significance evaluation method according to the present invention.

FIG. 1 is a schematic flowchart of a text-based news significance evaluation method according to an embodiment of the present invention. As shown in FIG. 1, the method includes the following five steps:

1. Reading text news. Specifically, in some embodiments, news texts in formats such as txt or pdf may be captured first through existing technologies such as web crawler. In other words, target news texts are captured. Then the target news texts are read in batches.
2. Preprocessing the text news to obtain original data. Specifically, in some embodiments, preprocessing operations on each news text may include Chinese text preprocessing and English text preprocessing. The Chinese text preprocessing includes word segmentation and deletion of punctuation marks, numerals, other characters, etc. The English text preprocessing includes: replacing English abbreviations, converting into lowercase characters, selecting words within a specific length range, deleting invalid characters, performing a spelling check, etc. All original data obtained after the preprocessing is stored in a csv file, including a path of an original document and cleaned data content.
3. Extracting feature values from the original data. The feature values include metadata, a keyword, and a probability model feature value. It needs to be noted that the metadata is used to calculate a quantity of numerals included in the original data.
4. Obtaining a score of each feature value according to a weight ratio corresponding to each feature value.
5. Evaluate significance of the text news according to the score of each feature value.

In some embodiments, the text news includes a news text in a txt or pdf format.

In some embodiments, the preprocessing includes, but is not limited to: converting a character sequence to a lowercase character, selecting a word within a specific length range, deleting an invalid character, deleting a numeral, deleting a stop word, and extracting a stem and restoring a part of speech. In some further embodiments, preprocessing operations on each news text includes Chinese text preprocessing and English text preprocessing. The Chinese text preprocessing includes word segmentation and deletion of punctuation marks, numerals, other characters, etc. The English text preprocessing includes: replacing English abbreviations, converting into lowercase characters, selecting words within a specific length range, deleting invalid characters, performing a spelling check, etc.

In some embodiments, different preprocessing methods are selected depending on the type of the feature value:

when the type of the feature value is metadata, preprocessing the text news by selecting the methods of deleting an invalid character and/or deleting a stop word;

when the type of the feature value is a keyword, preprocessing the text news by selecting the methods of deleting an invalid character and/or deleting a stop word and/or deleting a numeral; and when the type of the feature value is a probability model feature value, preprocessing the text news by selecting the methods of deleting an invalid character and/or deleting a stop word and/or deleting a numeral and/or extracting a stem and restoring a part of speech.

Specifically, in some embodiments, the preprocessing may be different processing performed on the news text depending on the type of feature value. For example, the following four processing methods a, b, c, and d are performed in the preprocessing:

a. deleting invalid characters;
b. deleting stop words;
c. deleting numerals; and
d. extracting stems and restoring parts of speech.

In the processing methods described above, a+b is suitable for processing metadata, a+b+c is suitable for processing keywords, and a+b+c+d is suitable for processing probability model feature values.

An example is provided as follows for illustration. The following news text is processed by using the a+b+c method:

"Defensive Investor—Must pass at least 6 of the following 7 tests: Score=2/7 Enterprising Investor—Must pass at least 4 of the following 5 tests, or be suitable for a Defensive Investor: Score=5/5 Key Data Balance Sheet—January 2015 Earnings Per Share Earnings Per Share—ModernGraham Dividend History Agilent Technologies is suitable for the Enterprising Investor, but not for the more conservative Defensive Investor, who is concerned about the insufficient earnings growth or stability over the last ten years, the short dividend history, and the high PEmg and PB ratios."

After the preprocessing, the following metadata is obtained, and may be used for extracting keywords:

"defensive investor pass following tests score enterprising investor pass following tests suitable defensive investor score key data balance sheet january earnings share earnings share moderngraham dividend history agilent technologies suitable enterprising investor conservative defensive investor concerned insufficient earnings growth stability years short dividend history high pemgpb ratios"

In some embodiments, regarding the extraction of the keywords, the obtaining of the keywords is dynamic to ensure real-time update of the data and improve accuracy of significance evaluation. For example, through training, recent popular words that have not occurred before are added as keywords, and all obtained keywords are sorted through popularity search, and then used for evaluation. Specifically, the following steps may be included:

S1. Constructing a Multivariate Dictionary

This step further includes: (a) selecting financial sector keywords to form a static dictionary, wherein keywords related to the financial sector may be extracted manually based on experience; (b) dynamically obtaining training set keywords through natural language processing and neural network training to form a dynamic dictionary, wherein the training set keywords do not overlap with the financial sector keywords, and it needs to be noted that the training set keywords are usually obtained through neural network training, and are new keywords that have never appeared in existing financial sector keywords and that relate to the financial sector; and (c) combining the static dictionary and the dynamic dictionary to form a multivariate dictionary.

Specifically, in some further embodiments, a quantity of the training set keywords is calculated and the training set keywords are sorted according to the popularity value. The first n training set keywords are selected and combined with the financial sector keywords to form a multivariate dictionary. In this case, the multivariate dictionary includes both static financial sector keywords and dynamically changing n training set keywords. It needs to be noted that a quantity n of the keywords herein may be flexibly set in actual practice as required.

In some further embodiments, a multivariate dictionary may be constructed through the following exemplary steps:

(i) selecting financial sector keywords to form a static dictionary, wherein keywords related to the financial sector may be extracted manually based on experience; generating a multivariate (including one-variable, two-variable, three-variable, four-variable, and five-variable) static dictionary according to existing financial words; and selecting first n keywords of the multivariate static dictionary. For example, Table 1 below shows first five keywords of a two-variable static dictionary generated according to financial words:

TABLE 1

First five keywords of a two-variable static dictionary
Two-variable static dictionary subsidiary company
money business
external factors
investment banking
low-price-earnings-ratio effect (ii) dynamically obtaining training set keywords through natural language processing and neural network training to form a dynamic dictionary, wherein the purpose of adding a training set keyword obtaining mechanism is to implement dynamic evaluation on news texts; and keyword terms generated by the training set may be dynamically updated by extracting the keywords from tens of thousands of pieces of financial news; and selecting first n keywords of the multivariate dynamic dictionary. For example, Table 2 below shows first five keywords of a two-variable dynamic dictionary generated according to a training set:

TABLE 2

First five keywords of a two-variable dynamic dictionary

| | words | count |
|---|---|---|
| 0 | Dow Jones | 4903 |
| 1 | Jones Industrial | 3368 |
| 2 | Industrial Average | 3321 |
| 3 | Dow DJIA | 1987 |
| 4 | trading points | 1974 |

(iii) combining the static two-variable dictionary and the dynamic two-variable dictionary into a multivariate dictionary. Specifically, in some embodiments, the quantity of the training set keywords is calculated and the training set keywords are sorted according to the popularity value. The first five training set keywords are selected and combined with the financial sector keywords to form a multivariate dictionary. In this case, the multivariate dictionary includes both static financial sector keywords and dynamically changing five training set keywords.

S2. Recognizing a Named Entity

This step includes: obtaining, through natural language processing and neural network training, a named entity such as a person name or an organization name for evaluation; and using a convolutional neural network model with a residual connection in an open-source library Spacy to extract the named entity; and recognizing the named entity as a keyword by using a neural network model—i.e., using recognized person name and organization name as keywords.

S3. Sorting Keywords

This step includes: extracting, through popularity search, a popularity value from the keyword in the multivariate dictionary described in step S1 and the keyword obtained by recognizing the named entity in step S2, and sorting the keywords according to the popularity value.

For instance, the extracting a probability model may include the steps below.

Step 1 is obtaining a model and training set keywords for significance evaluation by training the probability model.

Specifically, in some embodiments, the probability model is used to process a news text in the original data, for example, extracting a stem, restoring a part of speech, deleting a stop word, filtering out an invalid word, etc. In addition, by training a probability model, keywords may be selected and filtered. For example, keywords whose quantity of occurrences is less than a specific quantity are deleted, or keywords whose occurrence frequency is higher than a specific percentage are deleted, or the first 100,000 words are extracted, and then topic mining is performed to obtain a probability model.

The probability model is a latent Dirichlet allocation model. In the latent Dirichlet allocation model, a document is generated in the following method:

taking a sample from a Dirichlet allocation $\alpha$ to generate a topic distribution $\theta_i$ of a document i;

taking a sample from the topic distribution $\theta_i$ to generate a topic $z_{i,j}$ of a $j^{th}$ word of the document i;

taking a sample from a Dirichlet allocation $\beta$ to generate a word distribution $\phi_{z_{i,j}}$ corresponding to the topic $z_{i,j}$; and taking a sample from the word distribution $\phi_{z_{i,j}}$ to finally generate a word $w_{i,j}$;

wherein a joint distribution of all visible variables and hidden variables in the probability model is:

$$p(w_i, z_i, \theta_i, \Phi \mid \alpha, \beta) = \prod_{j=1}^{N} p(\theta_i \mid \alpha) p(z_{i,j} \mid \theta_i) p(\Phi \mid \beta) p(w_{i,j} \mid \phi_{z_{i,j}}); \text{ and}$$

a maximum likelihood estimation of a word distribution of a document is obtainable by integrating $\theta_i$ and $\phi_{z_{i,j}}$ in the foregoing formula and summing $z_{i,j}$:

$$p(w_i \mid \alpha, \beta) = \int_{\theta_i} \int_{\Phi} \sum_{z_i} p(w_i, z_i, \theta_i, \Phi \mid \alpha, \beta).$$

Step 2 is using Gibbs sampling to estimate an unknown parameter of the latent Dirichlet allocation model:

$$p(z_i = k \mid \vec{z}_{\neg i}, \vec{w}) \propto \frac{n_{m,\neg i}^{(k)} + \alpha_k}{\sum_{k=1}^{K}(n_{m,\neg i}^{(k)} + \alpha_k)} \cdot \frac{n_{k,\neg i}^{(t)} + \beta_t}{\sum_{t=1}^{V}(n_{k,\neg i}^{(t)} + \beta_t)}$$

wherein $n_{m,\neg i}^{(k)}$ is a quantity of occurrences of a topic k in m documents, and $n_{k,\neg i}^{(t)}$ is a quantity of occurrences of a word t in a $k^{th}$ topic.

In some embodiments, the obtaining of the training set keywords is dynamic, a target word that has not appeared in a training set is added as a keyword in the training set by training, and the training set keywords are sorted in real time through popularity search and then used for evaluation.

In some embodiments, the obtaining a score of each feature value according to a weight ratio corresponding to each feature value includes the following steps:

(a) calculating a weight corresponding to the metadata, and calculating a score corresponding to the metadata; optionally, in some specific embodiments, it may be set that apiece of metadata obtains a score of 9 points if a quantity of occurrences of the metadata exceeds that of 90% of all metadata, a piece of metadata obtains a score of 8 points if a quantity of occurrences of the metadata exceeds that of 80% of all metadata, and so on;

(b) calculating a weight corresponding to the keyword, and calculating a score corresponding to the keyword; optionally, in some specific embodiments, keywords may be divided into three parts: unigrams, bigrams, and other words; for each part, a keyword obtains a score of 9 points if a quantity of occurrences of the keyword is larger than that of 90% of the keywords obtained in the training set, a keyword obtains a score of 8 points if a quantity of occurrences of the keyword is larger than that of 80% and less than that of 90% of the keywords obtained in the training set, and so on; and (c) calculating a weight corresponding to the probability model feature value, and calculating a score corresponding to the probability model feature value; optionally, in some specific embodiments, a dichotomy-based scoring mechanism may be adopted. A probability model feature value obtains no score if the probability model feature value is higher than 90% of probability model feature values, or obtains a score depending on a quantity of topics mined.

It needs to be noted that the scoring method for each feature value is not limited to the methods mentioned herein. As long as the score corresponding to each feature value can be calculated according to actual production needs, the method for obtaining the score of each feature value according to the weight ratio corresponding to each feature value falls within the protection scope of the present invention.

Figure 2:
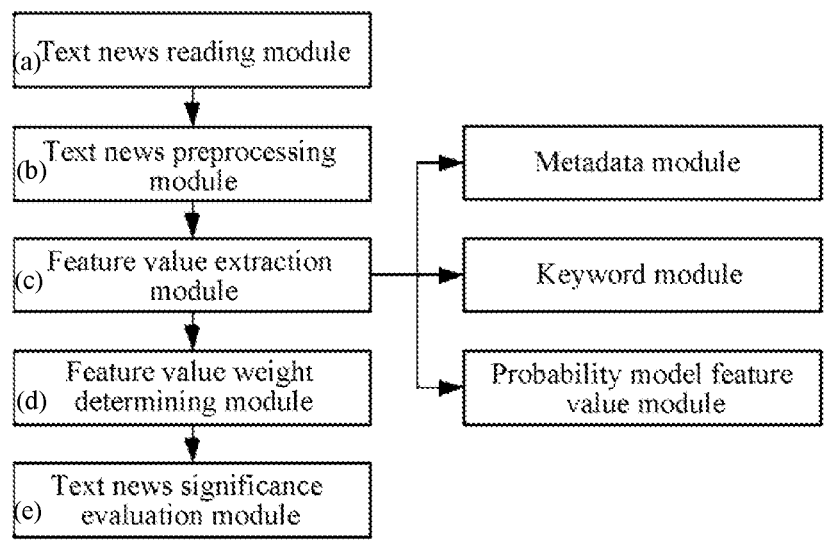
FIG. 2 is a schematic structural diagram of a text-based news significance evaluation apparatus according to the present invention.

The present invention further discloses a text-based news significance evaluation apparatus (e.g., comprising a processor in a computing device). FIG. 2 is a schematic structural diagram of a text-based news significance evaluation apparatus according to an embodiment of the present invention. As shown in FIG. 2, the apparatus includes:

(a) a text news reading module, configured to read text news, wherein the text news includes a news text in a txt or pdf format;

(b) a text news preprocessing module, configured to preprocess the text news read by the text news reading module to obtain original data, wherein the preprocessing includes, but is not limited to: converting a character sequence to a lowercase character, selecting a word within a specific length range, deleting an invalid character, deleting a numeral, extracting a stem and restoring a part of speech, and/or deleting a stop word;

(c) a feature value extraction module, configured to extract, from the original data, feature values including metadata, a keyword, and a probability model feature value;

(d) a feature value weight determining module, configured to calculate a weight ratio corresponding to each feature value, and determine a score of each feature value; and (e) a text news significance evaluation module, configured to evaluate significance of the text news according to the score of each feature value.

More specifically, the feature value extraction module may further include:

a metadata module, configured to calculate a quantity of numerals included in the original data;

a keyword module, configured to dynamically obtain keywords and sort the keywords according to a popularity value; and a probability model feature value module, configured to perform dynamic distribution training on a probability model, and obtain a model and training set keywords for significance evaluation.

Figure 3:
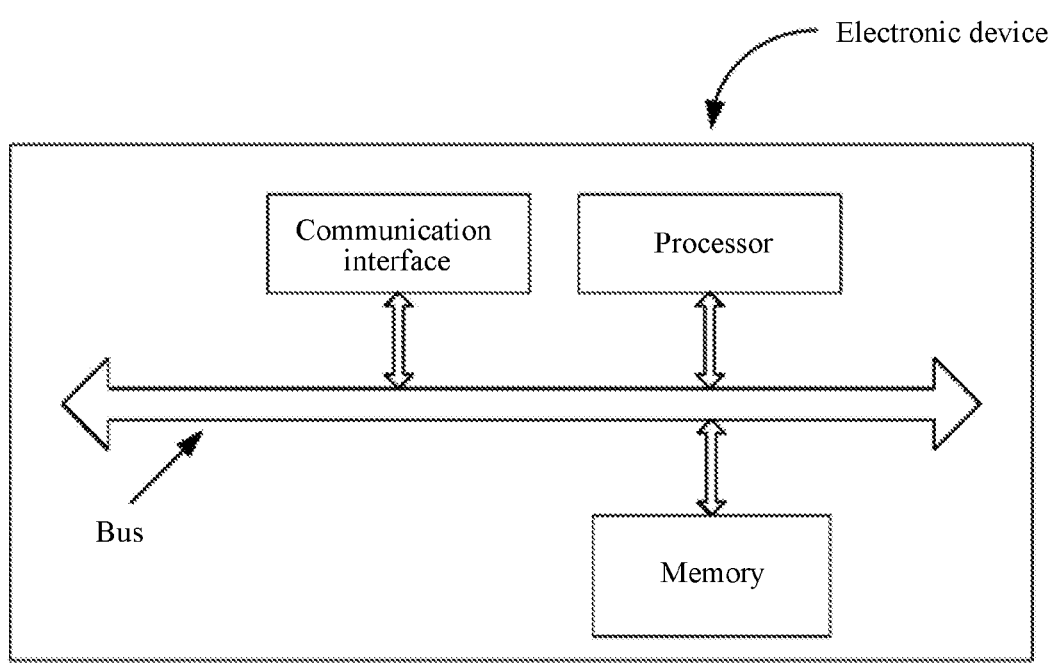
FIG. 3 is a schematic structural diagram of a text-based news significance evaluation electronic device according to the present invention.

Referring to FIG. 3, a text-based news significance evaluation electronic device is further provided according to an embodiment of the present invention. The device includes a memory, a processor, a communication interface, and a bus. The memory, the processor, and the communication interface are connected through the bus. The memory stores an executable module that can run on the processor. The processor is configured to execute the executable module stored in the memory, such as a computer program.

When executing the computer program, the processor implements the foregoing text-based news significance evaluation method or a method described in any possible implementation thereof.

The text-based news significance evaluation apparatus and electronic device provided in this embodiment of the present invention have the same technical features as the text-based news significance evaluation method provided in the foregoing embodiment, and therefore, can also solve the same technical problems and achieve the same technical effects.

The device, apparatus and system according to the present invention may relate to a computing device (e.g., smartphone, tablet, laptop computer, desktop computer, or other electronic device). In addition, the device and system according to the present invention may include an input unit (e.g., mouse, keyboard, stylus, touch-screen) and/or an output unit (e.g., monitor, screen, touch-screen) that a user utilizes for interaction, as well as monitoring means for such interactions. For example, a user interactions monitoring/sampling module may be further included to monitor all user interactions via the input unit and/or the output unit; and may record, log, track, capture, or otherwise sample such user interactions; and/or may otherwise collect user interaction data.

In summary, compared with existing technologies, the present invention provides a text-based news significance evaluation method, apparatus, and electronic device. The present invention uses natural language processing and a neural network to obtain a multivariate dictionary that includes financial sector keywords, combines a dynamic dictionary and a static dictionary, and updates a keyword dictionary in real time. The present invention dynamically extracts feature items for value evaluation of significant news by using pipelines of obtaining various keywords, assigns different weights to different feature items, and marks significance of financial news. In addition, based on a keyword popularity search mechanism, popularity of the keywords is obtained for scoring. Different weights are assigned to different feature items, and significance of financial news is marked. Dynamic evaluation is implemented on news texts, and accuracy of evaluation is improved greatly.

The foregoing shows and describes the basic principle and main features of the present invention and advantages of the present invention. A person skilled in the art should understand that the present invention is not limited by the foregoing embodiments. The foregoing embodiments and the descriptions of the specification merely explain principals of the present invention. Various variations and improvements of the present invention can be made without departing from the spirit and scope of the present invention, and the variations and improvements fall within the protection scope of the present invention. The protection scope claimed by the invention shall be defined by the attached claims and equivalents thereof.

What is claimed is:

1. A text-based news significance evaluation method configured for performing real-time dynamic significance evaluation in financial field, comprising:
   (a) reading text news;
   (b) preprocessing the text news to obtain original data;
   (c) extracting at least three different feature values from the original data, wherein the feature values comprise metadata, a keyword, and a probability model feature value,
      wherein the metadata is used to calculate a quantity of numerals included in the original data;
      extracting the keyword comprising constructing a multivariate dictionary, obtaining keywords based on the multivariate dictionary, and sorting the keywords based on a popularity value extracted from the keywords in the multivariate dictionary, said multivariate dictionary including a static dictionary with selected financial sector keywords and a separate dynamic dictionary with training set keywords dynamically obtained through natural language processing and neural network training, in which the training set keywords in the dynamic dictionary do not overlap with the selected financial sector keywords in the static dictionary; and
      extracting the probability model feature value comprising financial topic mining to obtain a probability model and using the probability model to perform extraction;
   (d) obtaining a numerical score of each feature value, according to a weight ratio corresponding to each feature value; and
   (e) evaluating significance of the text news according to the numerical score of each feature value.

2. The text-based news significance evaluation method of claim 1, wherein the text news comprises a news text in a txt or pdf format.

3. The text-based news significance evaluation method of claim 1, wherein the preprocessing comprises converting a character sequence to a lowercase character, selecting a word within a specific length range, deleting an invalid character, deleting a numeral, deleting a stop word, or extracting a stem and restoring a part of speech.

4. The text-based news significance evaluation method of claim 3, wherein the preprocessing comprises English text preprocessing and Chinese text preprocessing.

5. The text-based news significance evaluation method of claim 1, wherein the extracting the keyword comprises the following steps:
   S1: constructing the multivariate dictionary, further comprising:
      selecting financial sector keywords to forma the static dictionary;
      dynamically obtaining training set keywords through natural language processing and neural network training to form the dynamic dictionary, wherein the training set keywords in the dynamic dictionary are new keywords that do not exist in the static dictionary; and
      combining the static dictionary and the dynamic dictionary to form a multivariate dictionary;
   S2: recognizing a named entity, further comprising:
      obtaining a named entity for evaluation through natural language processing and neural network training; and
      recognizing the named entity as a keyword by using a neural network model; and
   S3: sorting keywords, further comprising:
      extracting, through popularity search, a popularity value from the keyword in the multivariate dictionary described in step S1 and the keyword obtained by recognizing the named entity in step S2, and sorting the keywords according to the popularity value.

6. The text-based news significance evaluation method of claim 1, wherein the extracting the probability model feature value comprises:
   obtaining a model and training set keywords for significance evaluation by training the probability model, and using the model to perform extraction;
   wherein the probability model is a latent Dirichlet allocation model, and is obtained by:
   taking a sample from a Dirichlet allocation $\alpha$ to generate a topic distribution $\theta_i$ of a document i;
   taking a sample from the topic distribution $\theta_i$ to generate a topic $z_{i,j}$ of a $j^{th}$ word of the document i;
   taking a sample from a Dirichlet allocation $\beta$ to generate a word distribution $\phi_{z_{i,j}}$ corresponding to the topic $z_{i,j}$; and
   taking a sample from the word distribution $\phi_{z_{i,j}}$ to finally generate a word $w_{i,j}$;
   wherein a joint distribution of all visible variables and hidden variables in the probability model is:

$$p(w_i, z_i, \theta_i, \Phi \mid \alpha, \beta) = \prod_{j=1}^{N} p(\theta_i \mid \alpha) p(z_{i,j} \mid \theta_i) p(\Phi \mid \beta) p(w_{i,j} \mid \phi_{z_{i,j}})$$

a maximum likelihood estimation of a word distribution of a document is obtainable by integrating $\theta_i$ and $\phi_{z_{i,j}}$ in the foregoing formula and summing $z_{i,j}$:

$$p(w_i \mid \alpha, \beta) = \int_{\theta_i} \int_{\Phi} \sum_{z_i} p(w_i, z_i, \theta_i, \Phi \mid \alpha, \beta); \text{ and}$$

using Gibbs sampling to estimate an unknown parameter of the latent Dirichlet allocation model:

$$p(z_i = k \mid \vec{z}_{\neg i}, \vec{w}) \propto \frac{n_{m,\neg i}^{(k)} + \alpha_k}{\sum_{k=1}^{K} \left(n_{m,\neg i}^{(k)} + \alpha_k\right)} \cdot \frac{n_{k,\neg i}^{(t)} + \beta_t}{\sum_{t=1}^{V} \left(n_{k,\neg i}^{(t)} + \beta_t\right)}$$

wherein $n_{m,\neg i}^{(k)}$ is a quantity of occurrences of a topic k in m documents, and $n_{m,\neg i}^{(t)}$ is a quantity of occurrences of a word t in a $k^{th}$ topic.

7. The text-based news significance evaluation method of claim 6, wherein the obtaining of the training set keywords is dynamic, a target word that has not appeared in a training set is added as a keyword in the training set by training, and the training set keywords are sorted in real time through popularity search and then used for evaluation.

8. A text-based news significance evaluation electronic device, comprising a memory and a processor, wherein the memory stores a computer program that runs on the processor, and the processor implements a method according to any of claims 1 to 7 when executing the computer program.

9. The text-based news significance evaluation electronic device of claim 8, further comprising a bus and a communication interface, wherein the memory, the processor, and the communication interface are connected through the bus.

10. The text-based news significance evaluation method of claim 1, wherein the method is implemented by a processor in a computing device.

11. A text-based news significance evaluation apparatus, comprising:
   a text news reading module, configured to read text news, wherein the text news comprises a news text in a txt or pdf format;
   a text news preprocessing module, configured to preprocess the text news read by the text news reading module to obtain original data, wherein the preprocessing converting a character sequence to a lowercase character, selecting a word within a specific length range, deleting an invalid character, deleting a numeral, extracting a stem and restoring a part of speech, or deleting a stop word;
   a feature value extraction module, configured to extract, from the original data, at least three different feature values, said feature values comprising metadata, a keyword, and a probability model feature value;
   a feature value weight determining module, configured to calculate a weight ratio corresponding to each feature value, and determine a numerical score of each feature value; and
   a text news significance evaluation module, configured to evaluate significance of the text news according to the score of each feature value,
   wherein the feature value extraction module further comprises:
   a metadata module, configured to calculate a quantity of numerals comprised in the original data;
   a keyword module, configured to construct a multivariate dictionary, obtain keywords based on the multivariate dictionary, and sort the keywords based on a popularity value, said multivariate dictionary including a static dictionary with selected financial sector keywords and a separate dynamic dictionary with training set keywords dynamically obtained through natural language processing and neural network training, in which the training set keywords in the dynamic dictionary do not overlap with the selected financial sector keywords in the static dictionary; and
   a probability model feature value module, configured to perform dynamic distribution training on a probability model, and obtain a model through financial topic mining and training set keywords for significance evaluation.

12. The text-based news significance evaluation apparatus of claim 11, wherein the feature value weight determining module is configured to:
   calculate a weight corresponding to the metadata and calculate the numerical score corresponding to the metadata, by comparing a quantity of occurrence of a piece of the metadata with a quantity of occurrence of all metadata;
   calculate a weight corresponding to the keyword and calculate the numerical score corresponding to the keyword, by comparing a quantity of occurrence of the keyword with that of all the keywords in the training set;
   calculate a weight corresponding to the probability model feature value and calculate the numerical score corresponding to the probability model feature value, by adopting a dichotomy-based scoring mechanism.

* * * * *